United States Patent [19]
Meeker et al.

[11] Patent Number: 5,960,950
[45] Date of Patent: Oct. 5, 1999

[54] FISHING ROD AND REEL ASSEMBLY CARRYING CASE

[75] Inventors: Paul K. Meeker, Hiram; Antonieta M. Giner; Enrique R. Giner, both of Aurora, all of Ohio

[73] Assignee: Meeker R & D, Inc., Hiram, Ohio

[21] Appl. No.: 08/948,119

[22] Filed: Oct. 9, 1997

[51] Int. Cl.$^6$ .................................................. B65D 85/00
[52] U.S. Cl. ..................... 206/315.11; 206/523; 206/317; 220/322
[58] Field of Search ............................ 206/315.1, 315.11, 206/523, 373, 317, 314, 14; 43/26; 190/102; 220/322, 324

[56] References Cited

U.S. PATENT DOCUMENTS

| | | | |
|---|---|---|---|
| 1,674,352 | 6/1928 | Adams | ....................................... 206/14 |
| 1,926,162 | 9/1933 | Moberly . | |
| 2,097,185 | 10/1937 | Hall . | |
| 2,650,449 | 9/1953 | Suring . | |
| 2,706,036 | 8/1955 | Neal | ........................................ 206/317 |
| 2,816,390 | 12/1957 | Vaughn et al. . | |
| 3,348,329 | 10/1967 | Seemann . | |
| 3,490,169 | 1/1970 | Tweed | .......................................... 43/26 |
| 3,641,697 | 2/1972 | Heidtman et al. . | |
| 3,678,611 | 7/1972 | Files . | |
| 3,802,113 | 4/1974 | Gatto, Sr. . | |
| 3,977,521 | 8/1976 | Murphy | ................................ 206/315.11 |
| 4,170,801 | 10/1979 | Ward . | |
| 4,171,588 | 10/1979 | Hoffman et al. . | |
| 4,531,632 | 7/1985 | Weber | ........................................ 206/14 |
| 4,967,504 | 11/1990 | Craft . | |
| 5,114,007 | 5/1992 | Chen | ........................................ 206/373 |
| 5,319,874 | 6/1994 | Vance . | |
| 5,429,235 | 7/1995 | Chen | ........................................ 206/373 |
| 5,547,079 | 8/1996 | Pino . | |
| 5,704,158 | 1/1998 | Whiteaker | ........................... 206/315.11 |

*Primary Examiner*—Paul T. Sewell
*Assistant Examiner*—Nhan T. Lam
*Attorney, Agent, or Firm*—Oldham & Oldham Co., L.P.A.

[57] ABSTRACT

A fishing rod and reel assembly carrying case having two (2) elongated housing sections attached along one elongated edge thereof by a pivotal connection, such as one or more hinges. The interior of each of the two (2) elongated housing sections includes a cavity into which a fishing rod and reel assembly can be placed and one of the elongated housing sections includes one or more tackle box compartments having dividers positioned therein and pivotally attached cover portions which cover and retain fishing tackle and other fishing equipment therein. The two (2) elongated housing sections can be closed upon each other and latched in this position to form an elongated fishing rod and reel assembly carrying case having an integral handle portion to carry the enclosed fishing rod and reel assembly carrying case. When opened, the two (2) elongated housing sections lay in a substantially flat orientation on the ground or other horizontal surface and permit access to the fishing rod and reel assembly, as well as to the fishing tackle and other fishing equipment, stored therein.

19 Claims, 3 Drawing Sheets

FISHING ROD AND REEL ASSEMBLY CARRYING CASE

BACKGROUND AND SUMMARY OF THE INVENTION

The present invention relates generally to a new and novel fishing rod and reel assembly carrying case. More particularly, the present invention relates to a new and novel fishing rod and reel assembly carrying case which covers and retains a fishing rod and reel assembly, as well as fishing tackle and other fishing equipment, therein.

A durable and functional carrying case for retaining a fishing rod and reel assembly, as well as fishing tackle and other fishing equipment, therein would be very desirable to fishermen and other outdoorsmen. U.S. Pat. Nos. 4,170,801; 4,171,588 and 4,967,504 disclose the general concept of a fishing rod carrying case including two (2) pivotally connected substantially symmetrical elongated housing members. However, each of the fishing rod carrying cases disclosed in these issued United States patents include features which limit their durability and/or functionality. Accordingly, such known prior art fishing rod carrying cases have experienced only limited acceptance and appeal to fishermen and other outdoorsmen.

Accordingly, an object of the present invention is the provision of a fishing rod and reel assembly carrying case which covers and retains a fishing rod and a fishing reel as an assembly and does not require the removal of the fishing reel from the fishing rod for storage therein.

Another object of the present invention is the provision of a fishing rod and reel assembly carrying case which has an internal storage compartment which is substantially weatherproof and facilitates the storage of a fishing rod and reel assembly, as well as fishing tackle and other fishing equipment, therein in a relatively clean and dry environment to minimize damage to the fishing rod and reel assembly, as well as the fishing tackle and other fishing equipment, stored therein from the outside environment, including moisture, dirt and dust.

Yet another object of the present invention is the provision of a fishing rod and reel assembly carrying case which is durable and lightweight and which includes an integral carrying handle therein.

These and other objects of the present invention are attained by the provision of a fishing rod and reel assembly carrying case having two (2) elongated housing sections attached along one elongated side thereof by a pivotal connection, such as one or more hinges. The interior of each of the two (2) elongated housing sections includes a cavity into which a fishing rod and reel assembly can be placed and one of the elongated housing sections includes one or more tackle box compartments having dividers positioned therein and pivotally attached cover portions which cover and retain fishing tackle and other fishing equipment therein. The two (2) elongated housing sections can be closed upon each other and latched in a closed position to form an elongated fishing rod and reel assembly carrying case having an integral handle portion to carry the enclosed fishing rod and reel assembly carrying case. When opened, the two (2) elongated housing sections lay in a substantially flat orientation on the ground or other horizontal surface and permit access to the fishing rod and reel assembly, as well as to the fishing tackle and other fishing equipment, stored therein.

Other advantages and novel features of the present invention will become apparent in the following detailed description of the invention when considered in conjunction with the accompanying drawings.

DETAILED DESCRIPTION OF THE DRAWINGS

Figure 1:
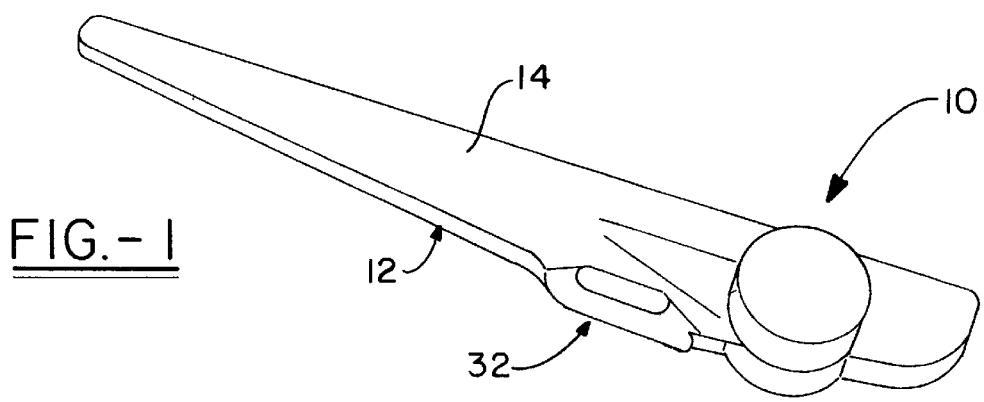
FIG. 1 illustrates a side perspective view of a fishing rod and reel assembly carrying case in a closed position in accordance with a first preferred embodiment of the present invention.
Figure 2:
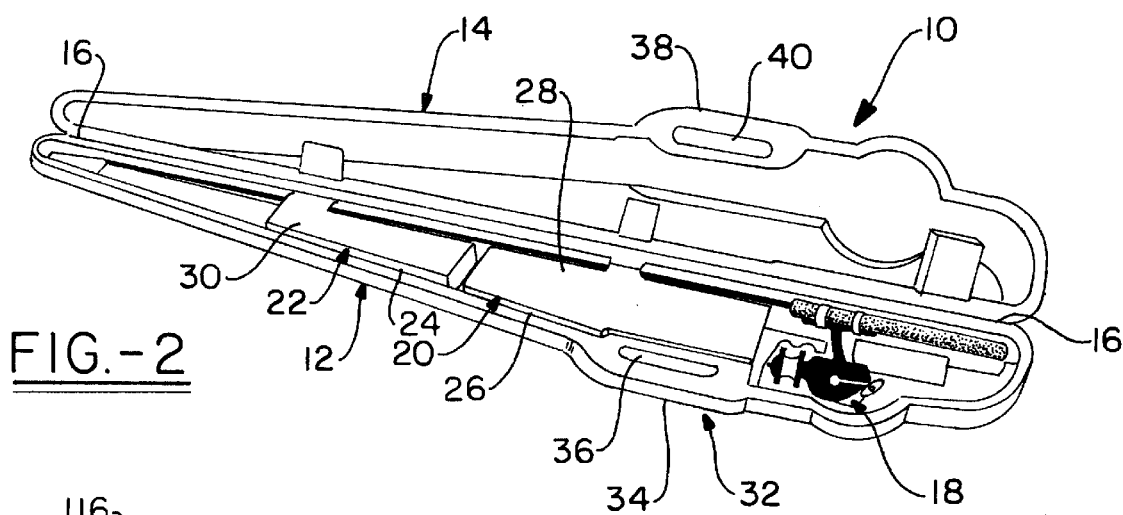
FIG. 2 illustrates a side perspective view of the fishing rod and reel assembly carrying case in an open position in accordance with the first preferred embodiment of the present invention shown in FIG. 1.
Figure 3:
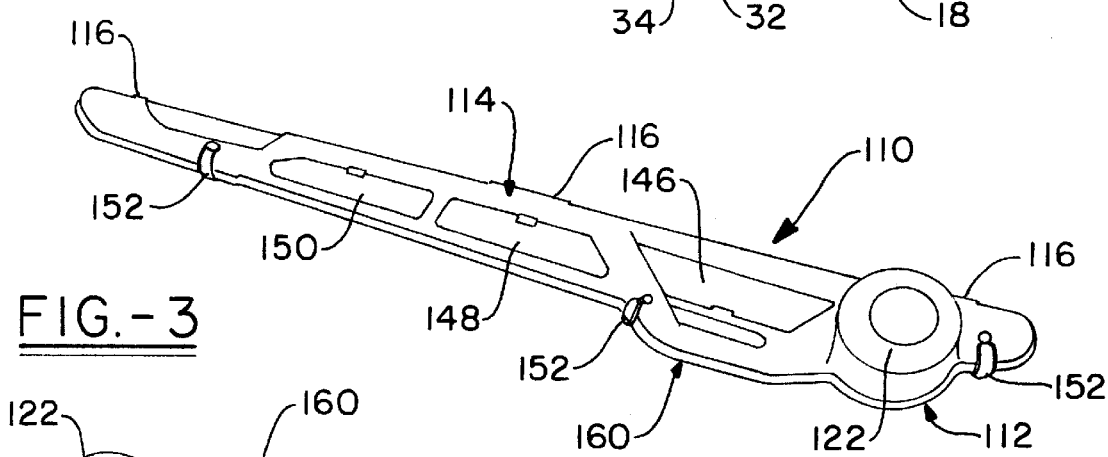
FIG. 3 illustrates a side perspective view of a fishing rod and reel assembly carrying case in a closed position in accordance with a second preferred embodiment of the present invention.
Figure 4:
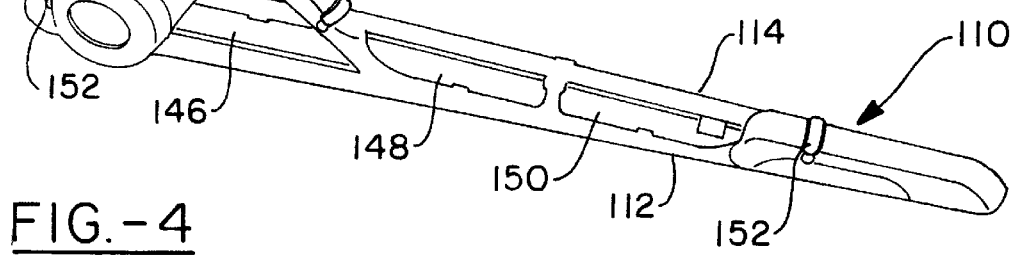
FIG. 4 illustrates a top perspective view of the fishing rod and reel assembly carrying case in a closed position in accordance with the second preferred embodiment of the present invention shown in FIG. 3.
Figure 5:
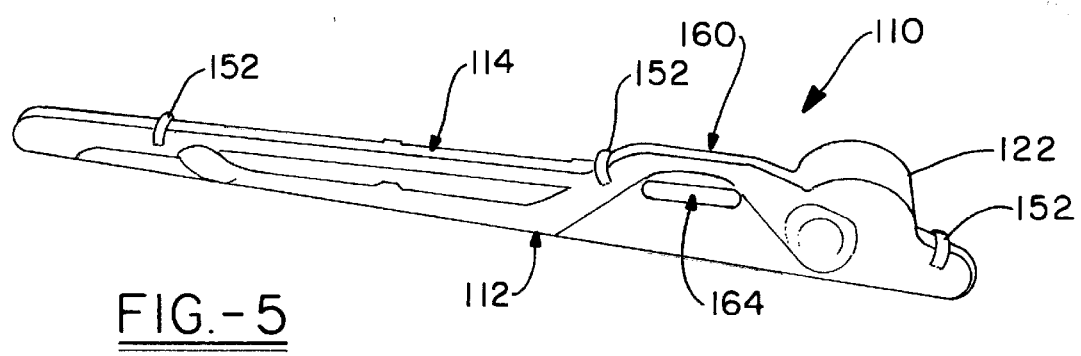
FIG. 5 illustrates a rear perspective view of the fishing rod and reel assembly carrying case in a closed position in accordance with the second preferred embodiment of the present invention shown in FIG. 3.
Figure 6:
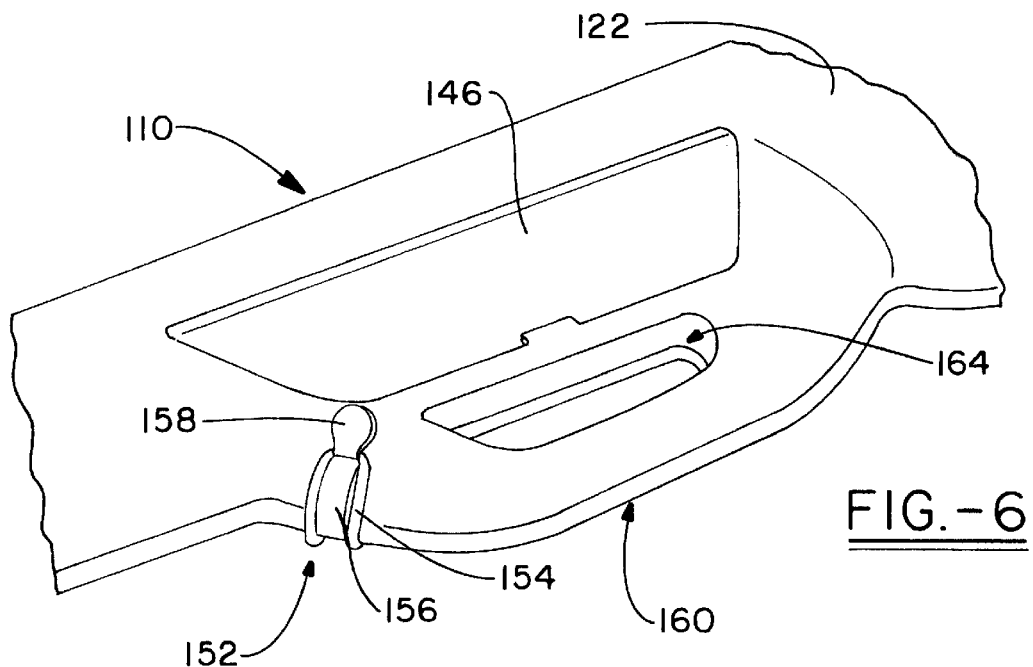
FIG. 6 illustrates a larger scale side perspective view of the fishing rod and reel assembly carrying case in a closed position in accordance with the second preferred embodiment of the present invention shown in FIG. 3 taken from box 6—6 in FIG. 3 showing a larger view of the integral handle and the latching arrangement.

In the following detailed description of preferred embodiments of the present invention, reference is made to the accompanying drawings which, in conjunction with this detailed description, illustrate and describe a first preferred embodiment and a second preferred embodiment of a fishing rod and reel assembly carrying case in accordance with the present invention. Referring first to FIGS. 1 and 2, which illustrate a first side perspective view and a second side perspective view of a fishing rod and reel assembly carrying case, generally identified by reference number 10, in accordance with a first preferred embodiment of the present invention, fishing rod and reel assembly carrying case 10 generally includes first substantially symmetrical elongated housing section 12 and second substantially symmetrical elongated housing section 14 which are preferably fabricated from a plastic material and are attached along one corresponding elongated edge by a pivotal connection, such as one or more hinges 16. As seen in FIG. 2, the interior of each of first substantially symmetrical elongated housing section 12 and second substantially symmetrical elongated housing section 14 includes a cavity into which a fishing rod and reel assembly 18 can be placed and first substantially symmetrical elongated housing section 12 includes tackle boxes 20 and 22 each of which consist of base portions 24 and 26, respectively, having dividers positioned therein and pivotally attached cover portions 28 and 30, respectively, which cover and retain fishing tackle and other fishing equipment therein. Cover portions 28 and 30 can be pivotally attached to base portions 24 and 26 along one edge thereof by, for example, one or more piano type hinges or an integral "living" type hinge extending between cover portions 28 and 30 and base portions 24 and 26, respectively.

First substantially symmetrical elongated housing section 12 and second substantially symmetrical elongated housing section 14 can be closed upon each other and latched in this position to form an enclosed fishing rod and reel assembly carrying case 10 and includes integral handle assembly 32 to carry fishing rod and reel assembly carrying case 10. Integral handle portion 32 includes a first handle portion 34 extending outwardly from first substantially symmetrical elongated housing section 12 having longitudinally elongated opening 36 and second handle portion 38 extending outwardly from second substantially symmetrical elongated housing section 14 having longitudinally elongated opening 40 which corresponds with longitudinally elongated opening 36 in first substantially symmetrical elongated housing section 12. When opened, first substantially symmetrical elongated housing section 12 and second substantially symmetrical elongated housing section 14 lay in a substantially flat orientation on the ground or other horizontal surface and permit access to fishing rod and reel assembly 18, as well as to the fishing tackle and other fishing equipment, stored therein.

Figure 7:
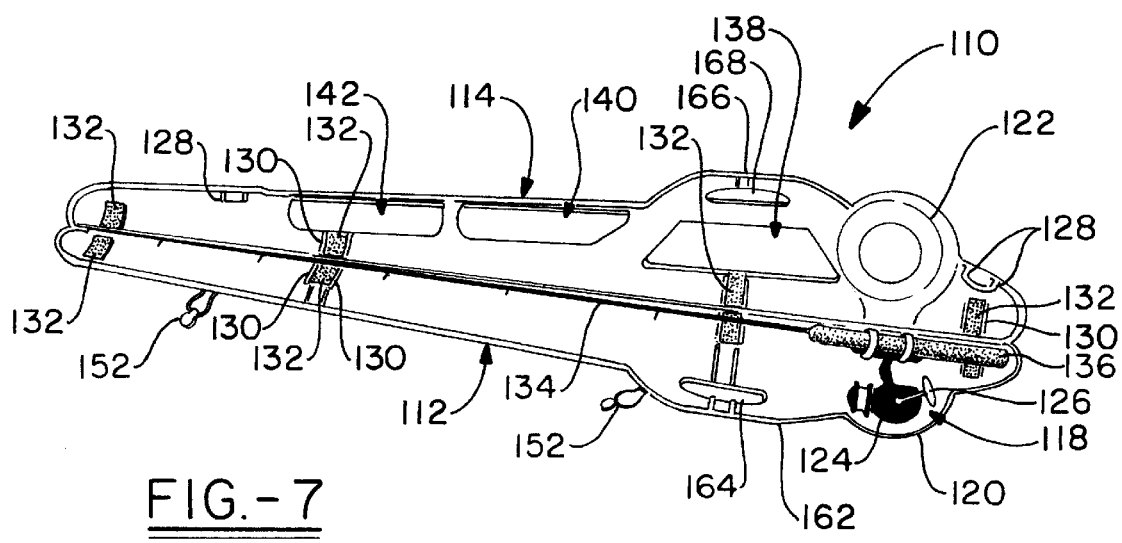
FIG. 7 illustrates a side perspective view of the fishing rod and reel assembly carrying case in an open position in accordance with the second preferred embodiment of the present invention shown in FIG. 3.
Figure 8:
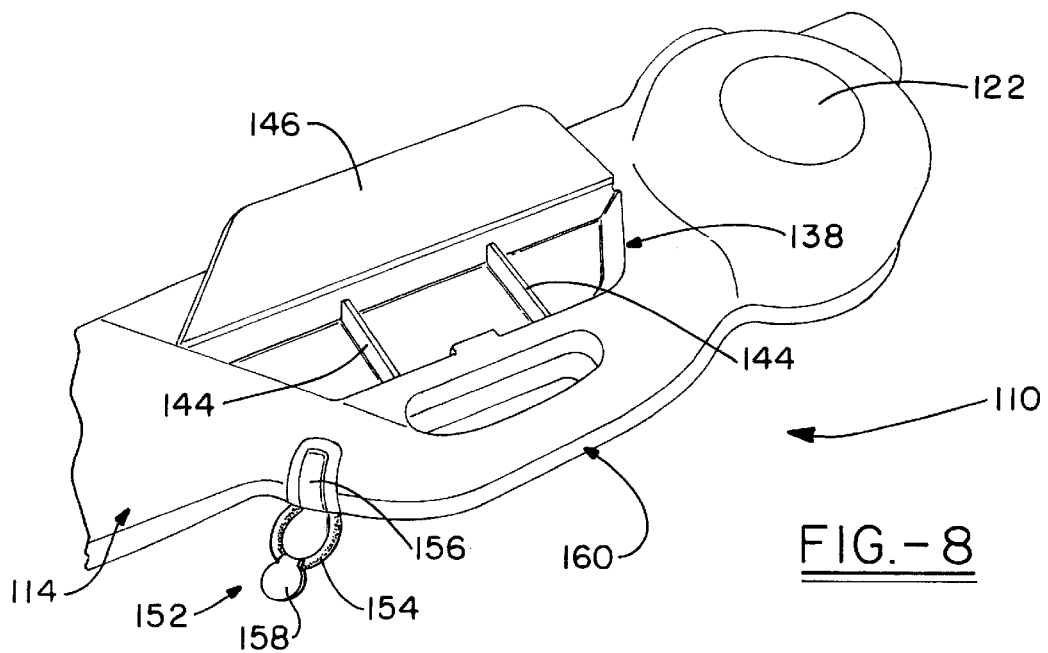
FIG. 8 illustrates a larger scale side perspective view of the fishing rod and reel assembly carrying case in a closed position in accordance with the second preferred embodiment of the present invention shown in FIG. 3 taken from box 8—8 in FIG. 3 showing a larger view of the integral handle, the latching arrangement and the recessed area adjacent to the integral handle.
Figure 9:
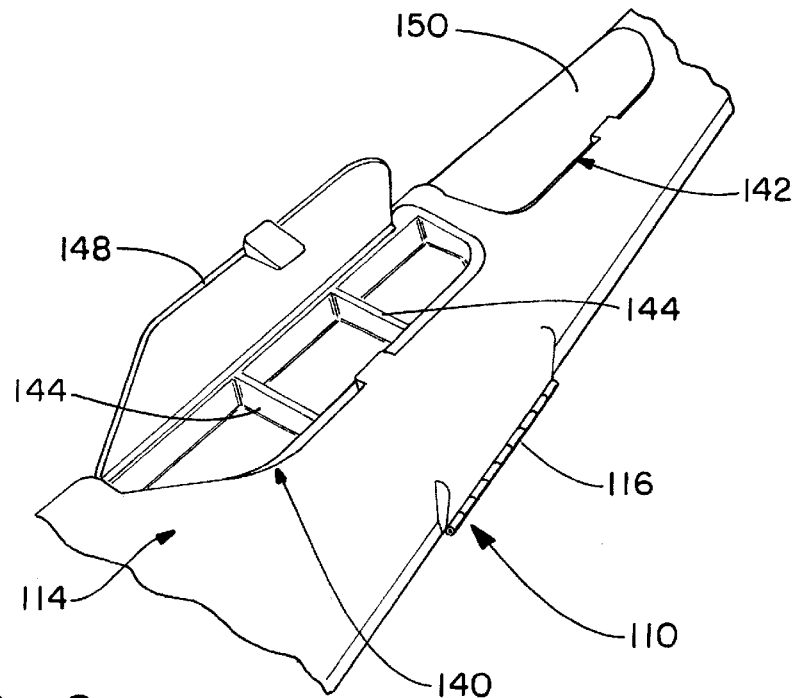
FIG. 9 illustrates a larger scale side perspective view of the fishing rod and reel assembly carrying case in a closed position in accordance with the second preferred embodiment of the present invention shown in FIG. 3 taken from box 9—9 in FIG. 3 showing a larger view of the second and third recessed areas in the side of the top elongated housing section.

Referring to FIGS. 3 through 9, which illustrate a first side perspective view, a top perspective view, a rear perspective view, a first larger scale side perspective view, a second side perspective view, a second larger scale side perspective view and a third larger scale side perspective view of a fishing rod and reel assembly carrying case, generally identified by reference number 110, in accordance with a second preferred embodiment of the present invention, fishing rod and reel assembly carrying case 110 generally includes bottom elongated housing section 112 and top elongated housing section 114 which are attached along one corresponding elongated edge thereof by a pivotal connection, such as one or more hinges 116. As seen in FIG. 7, bottom elongated housing section 112 and top elongated housing section 114 are preferably fabricated from a plastic material and are formed slightly longer than fishing rod and reel assembly 118 and the interior of each of bottom elongated housing section 112 and top elongated housing section 114 includes a cavity into which fishing rod and reel assembly 118 can be placed. Bottom elongated housing section 112 and top elongated housing section 114 include cylindrical enlargements 120 and 122, respectively, which accommodate fishing reel 124 therein. Cylindrical enlargement 122 in top elongated housing section 114 is preferably larger than cylindrical enlargement 120 in bottom elongated housing section 112 to accommodate crank handle 126 of fishing reel 124 in any position of its 360 degree rotation. The interior of bottom elongated housing section 112 and top elongated section 114 include guide ribs 128, which are preferably molded, to assist in aligning bottom elongated section 112 and top elongated section 114 when fishing rod and reel assembly carrying case 110 is closed. The interior of bottom elongated housing section 112 and top elongated housing section 114 also include parallel ribs 130 which are preferably spaced approximately one (1) inch apart and foam 132 is preferably placed between adjacent parallel ribs 130. Parallel ribs 130 and foam 132 are located such that when bottom elongated housing section 112 and top elongated housing section 114 are closed, foam 132 clamps around fishing rod 134 and fishing rod handle 136 to secure fishing rod and reel assembly 118 in position.

The exterior of top elongated housing section 114 includes recessed areas 138, 140 and 142 where fishing tackle and other fishing equipment can be stored. Each of recessed areas 138, 140 and 142 preferably include dividers 144 positioned therein and pivotally attached cover portions 146, 148 and 150, respectively, which cover and retain fishing tackle and other fishing equipment therein. Cover portions 146, 148 and 150 can be pivotally attached over recessed areas 138, 140 and 142, respectively, along one edge thereof by, for example, one or more piano type hinges. Cover portions 146, 148 and 150 are preferably fabricated from a transparent or translucent material so the contents of recessed areas 138, 140 and 142 can be observed without opening cover portions 146, 148 and 150.

Bottom elongated housing section 112 and top elongated housing section 114 are preferably secured in the closed position of fishing rod and reel assembly carrying case 110 along their unhinged sides by latches 152, three (3) of which are shown on fishing rod and reel assembly carrying case 110, although other numbers of latches 152 could be readily used if desired. Latches 152 each include a substantially "U" shaped section of elastic cord 154 which is attached to bottom elongated housing section 112. Substantially "U" shaped section of elastic cord 154 preferably has sufficient length to stretch and "snap" over projection 156 formed in top elongated housing section 114. Each substantially "U" shaped section of elastic cord 154 preferably includes tab 158, which is preferably fabricated from a plastic material, to allow substantially "U" shaped section of elastic cord 154 to be readily grasped to latch and unlatch fishing rod and reel assembly carrying case 110.

Bottom elongated housing section 112 and top elongated housing section 114 can be closed upon each other and latched in a closed position to form an enclosed fishing rod and reel assembly carrying case 110 and includes integral handle assembly 160 to carry fishing rod and reel assembly carrying case 110. Integral handle portion 160 includes first handle portion 162 extending outwardly from bottom elongated housing section 112 having longitudinally elongated opening 164 and second handle portion 166 extending outwardly from top elongated housing section 114 having longitudinally elongated opening 168 which corresponds with longitudinally elongated opening 164 in bottom elongated housing section 112. When opened, bottom elongated housing section 112 and top elongated housing section 114 lay in a substantially flat orientation on the ground or other horizontal surface and permit access to fishing rod and reel assembly 118, as well as to the fishing tackle and other fishing equipment, stored therein.

Preferred embodiments of fishing rod and reel assembly 10 and 110 are designed to accommodate a fishing kit, including a fishing rod, fishing reel, line, sinkers, bobber, hook, etc. therein in a completely assembled "ready to fish" state and to also store an assortment of fishing tackle and other fishing equipment therein. A further advantage of fishing rod and reel assembly carrying case 10 and 110 is to provide protection for the fishing rod, the fishing reel, the fishing tackle and other fishing equipment, which is often expensive and delicate, from tangling, banging and the external environment, including moisture, dust and dirt. Yet another advantage of fishing rod and reel assembly carry case 10 and 110 is to enhance the safety and convenience of transporting a fully assembled fishing rod and reel assembly by substantially reducing the risk to people and property from poking of the long, skinny fishing rod or being caught on an exposed fishing hook.

It is also intended that a shorter version of fishing rod and reel assembly carrying case 10 and 110 could also be made to accommodate a longer fishing rod with a middle split therein. In this case, the fishing rod, fishing reel and fishing line could still be left assembled, except for the separation of the two halves of the fishing rod. A protrusion positioned where the split would lie in the interior of fishing rod and reel assembly carrying case 10 and 110 would secure the fishing line and preclude it from tangling.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. A fishing rod and reel assembly carrying case for storing a fishing rod and reel assembly therein, said fishing rod and reel assembly carrying case comprising:

a bottom elongated housing section having an interior cavity to accommodate the fishing rod and reel assembly therein, said interior cavity of said bottom elongated housing section including a cylindrical enlargement extending outwardly therefrom to accommodate the fishing reel therein and an outwardly extending handle portion having an elongated opening therein;

a top elongated housing section pivotally attached to said bottom elongated housing section along an elongated edge thereof, said top elongated housing section having an interior cavity to accommodate the fishing rod and reel assembly therein which corresponds to said interior cavity in said bottom elongated housing section, said interior cavity of said top elongated housing section having a cylindrical enlargement extending outwardly therefrom to accommodate the fishing reel therein and an outwardly extending handle portion having an elongated opening therein which corresponds to said elongated opening in said bottom elongated housing section when said bottom elongated housing section and said top elongated housing section are in a closed position, said cylindrical enlargement in said top elongated housing section corresponds to and has a larger diameter than said cylindrical enlargement in said bottom elongated housing section; and at least one recessed portion on said exterior of said top elongated housing section to retain fishing tackle and other fishing equipment therein.

2. The fishing rod and reel assembly carrying case in accordance with claim 1, wherein said bottom elongated housing section is pivotally attached to said top elongated housing along an elongated edge thereof by a hinge.

3. The fishing rod and reel assembly carrying case in accordance with claim 1, wherein said bottom elongated housing section is pivotally attached to said top elongated housing section along an elongated edge thereof by a piano type hinge.

4. The fishing rod and reel assembly carrying case in accordance with claim 1, wherein said at least one recessed portion on the exterior of said top elongated housing section includes a pivotally attached cover portion which covers and retains fishing tackle and other fishing equipment therein.

5. The fishing rod and reel assembly carrying case in accordance with claim 1, wherein said at least one recessed portion includes dividers which form separate compartments in said recessed portions to separate and retain fishing tackle and other fishing equipment therein.

6. The fishing rod and reel assembly carrying case in accordance with claim 5, wherein said at least one recessed portion includes a pivotally attached cover portion which covers and protects fishing tackle and other fishing equipment stored therein.

7. The fishing rod and reel assembly carrying case in accordance with claim 6, wherein said pivotally attached cover portion is transparent to permit the contents of said at least one recessed portion to be viewed without opening said pivotally attached cover portion.

8. The fishing rod and reel assembly carrying case in accordance with claim 1, wherein said bottom elongated housing section and said top elongated housing section lie flat on the ground or some other horizontal surface when said bottom elongated housing section and said top elongated housing section are in an open position.

9. The fishing rod and reel assembly carrying case in accordance with claim 8, further including a latching arrangement to secure said bottom elongated housing section and said top elongated housing section in a closed position.

10. The fishing rod and reel assembly carrying case in accordance with claim 1, further including a latching arrangement to secure said bottom elongated housing section and said top elongated housing section in a closed position.

11. The fishing rod and reel assembly carrying case in accordance with claim 9, wherein said latching arrangement includes a "U" shaped elastic cord upwardly extending from an elongated side of said bottom elongated housing section opposite to said elongated side of said bottom elongated housing section pivotally attached to said top elongated housing section and said top elongated housing section includes a projection corresponding to said "U" shaped elastic cord on an elongated side of said top elongated housing section opposite to said elongated side of said top elongated housing section pivotally attached to said bottom elongated housing section and said "U" shaped elastic cord is extended and positioned over said projection to retain said bottom elongated housing section and said top elongated housing section in a closed position.

12. The fishing rod and reel assembly carrying case in accordance with claim 10, wherein said "U" shaped elastic cord includes an extending tab to assist in grasping said "U" shaped elastic cord to extend and position said "U" shaped elastic cord over said projection to retain said bottom elongated housing section and said top elongated housing section in a closed position.

13. The fishing rod and reel assembly carrying case in accordance with claim 9, wherein said bottom elongated housing section is pivotally attached to said top elongated housing along an elongated edge thereof by a hinge.

14. The fishing rod and reel assembly carrying case in accordance with claim 9, wherein said at least one recessed portion on the exterior of said top elongated housing section includes a pivotally attached cover portion which covers and retains fishing tackle and other fishing equipment therein.

15. The fishing rod and reel assembly carrying case in accordance with claim 9, wherein said at least one recessed portion includes dividers which form separate compartments in said recessed portions to separate and retain fishing tackle and other fishing equipment therein.

16. The fishing rod and reel assembly carrying case in accordance with claim 9, wherein said bottom elongated housing section and said top elongated housing section lie flat on the ground or some other horizontal surface with said bottom elongated housing section and said top elongated housing section are in an open position.

17. The fishing rod and reel assembly carrying case in accordance with claim 9, wherein at least one of said interior cavity of said bottom elongated housing section and said interior cavity of said top elongated housing section include parallel ribs which retain a foam material therebetween to assist in positioning and securing the fishing rod and reel assembly in the interior cavity of said fishing rod and reel assembly carrying case when said bottom elongated housing section and said top elongated housing section are closed into a closed position.

18. The fishing rod and reel assembly carrying case in accordance with claim 1, wherein at least one of said bottom elongated housing section and said top elongated housing section includes guide ribs to assist in aligning said bottom elongated housing section and said top elongated housing section when said bottom elongated housing section and said top elongated housing section are closed into a closed position.

19. The fishing rod and reel assembly carrying case in accordance with claim 1, wherein at least one of said interior cavity of said bottom elongated housing section and said interior cavity of said top elongated housing section include parallel ribs which retain a foam material therebetween to assist in positioning and securing the fishing rod and reel assembly in the interior cavity of said fishing rod and reel assembly carrying case when said bottom elongated housing section and said top elongated housing section are closed into a closed position.

* * * * *